(12) United States Patent
Ogushi (10) Patent No.: US 9,261,184 B2
(45) Date of Patent: Feb. 16, 2016

(54) ROTARY MACHINERY WITH A ONE-WAY CLUTCH INTEGRATED PULLEY

(71) Applicant: Keisuke Ogushi, Kanagawa (JP)

(72) Inventor: Keisuke Ogushi, Kanagawa (JP)

(73) Assignee: NSK Ltd., Tokyo (JP)

( * ) Notice: Subject to any disclaimer, the term of this patent is extended or adjusted under 35 U.S.C. 154(b) by 178 days.

(21) Appl. No.: 13/824,353

(22) PCT Filed: Nov. 22, 2012

(86) PCT No.: PCT/JP2012/080360
§ 371 (c)(1),
(2) Date: May 20, 2013

(87) PCT Pub. No.: WO2013/077422
PCT Pub. Date: May 30, 2013

(65) Prior Publication Data
US 2014/0083812 A1  Mar. 27, 2014

(30) Foreign Application Priority Data

Nov. 25, 2011  (JP) .................................. 2011-257159
Nov. 14, 2012  (JP) .................................. 2012-249855

(51) Int. Cl.
| F16D 3/00 | (2006.01) |
| F16H 55/14 | (2006.01) |
| F16H 55/36 | (2006.01) |
| F16D 41/066 | (2006.01) |

(52) U.S. Cl.
CPC .............. *F16H 55/36* (2013.01); *F16D 41/066* (2013.01)

(58) Field of Classification Search
CPC ... F16H 55/36; F16H 2055/366; F02B 67/06; F16D 41/067; F16D 41/206

USPC ......................................................... 474/94, 70
See application file for complete search history.

(56) References Cited

U.S. PATENT DOCUMENTS

| 4,095,685 A | 6/1978 | McDonald et al. |
| 5,517,957 A * | 5/1996 | Wagner et al. ............. 123/192.1 |
| 5,595,272 A * | 1/1997 | Zhou .......................... 192/45.02 |
| 5,675,202 A * | 10/1997 | Zenmei et al. ................ 310/100 |
| 6,095,301 A * | 8/2000 | Fujiwara et al. ......... 192/45.008 |
| 6,237,736 B1 * | 5/2001 | Ouchi ......................... 192/41 R |
| 6,247,571 B1 | 6/2001 | Nakane et al. |
| 6,443,280 B2 * | 9/2002 | Ouchi ...................... 192/45.006 |

(Continued)

FOREIGN PATENT DOCUMENTS

| CA | 1067433 A | 12/1979 |
| DE | 697 35 182 T2 | 8/2006 |

(Continued)

*Primary Examiner* — Henry Liu
(74) *Attorney, Agent, or Firm* — Shapiro, Gabor and Rosenberger, PLLC (57) ABSTRACT

Construction of rotary machinery with a one-way clutch integrated pulley is achieved that is capable of reducing the manufacturing cost when the location in the axial direction of the one-way clutch integrated pulley 9a with respect to the rotary machinery 1a changes. In construction where a sleeve 10a of a one-way clutch integrated pulley 9a is supported by and fastened to a rotating shaft 4 in a housing 2, by placing a circular ring shaped spacer 35 between one end surface of the sleeve 10a and the other end surface of a support bearing 3 for the rotating shaft 4, it is possible to position the one-way clutch integrated pulley 9a in the axial direction with respect to the rotary machinery 1a without changing the length of the sleeve 10a for each type of vehicle.

2 Claims, 8 Drawing Sheets

(56) References Cited

U.S. PATENT DOCUMENTS

| | | | |
|---|---|---|---|
| 6,637,570 B2* | 10/2003 | Miller et al. | 192/41 S |
| 6,676,548 B2* | 1/2004 | Fujiwara | 474/70 |
| 7,004,861 B2* | 2/2006 | Fujiwara | 474/74 |
| 7,056,247 B2* | 6/2006 | Fujiwara et al. | 474/199 |
| 7,143,881 B2* | 12/2006 | Ichihara et al. | 192/45.009 |
| 7,153,227 B2* | 12/2006 | Dell et al. | 474/70 |
| 7,182,707 B2* | 2/2007 | Nakamura | 474/70 |
| 7,201,685 B2* | 4/2007 | Terada et al. | 474/70 |
| 7,993,228 B2* | 8/2011 | Nosaka et al. | 474/170 |
| 7,998,008 B2* | 8/2011 | Kamdem et al. | 474/94 |
| 8,944,947 B2* | 2/2015 | Yamatani et al. | 474/166 |
| 9,033,832 B1* | 5/2015 | Serkh et al. | 474/70 |
| 2002/0183147 A1* | 12/2002 | Fujiwara | 474/70 |
| 2003/0224886 A1* | 12/2003 | King et al. | 474/70 |
| 2004/0014540 A1* | 1/2004 | Dell et al. | 474/70 |
| 2004/0072641 A1* | 4/2004 | Nakamura | 474/70 |
| 2004/0092346 A1* | 5/2004 | King et al. | 474/70 |
| 2005/0148417 A1* | 7/2005 | Garabello et al. | 474/70 |
| 2005/0250607 A1* | 11/2005 | Jansen et al. | 474/74 |
| 2005/0261092 A1* | 11/2005 | Ochiai et al. | 474/70 |
| 2008/0078647 A1* | 4/2008 | Watanabe et al. | 192/41 A |
| 2009/0176608 A1* | 7/2009 | Jansen et al. | 474/74 |
| 2010/0120563 A1* | 5/2010 | Serkh et al. | 474/74 |
| 2011/0015018 A1* | 1/2011 | Yamatani et al. | 474/166 |

FOREIGN PATENT DOCUMENTS

| | | |
|---|---|---|
| EP | 0 826 899 A2 | 3/1998 |
| JP | 63-096324 A | 4/1988 |
| JP | 10-132028 A | 5/1998 |
| JP | 2000-170798 A | 6/2000 |
| JP | 2000-337400 A | 12/2000 |
| JP | 2001-349413 A | 12/2001 |
| JP | 2003-232433 A | 8/2003 |
| JP | 2005-009576 A | 1/2005 |
| JP | 2006-119007 A | 5/2006 |
| JP | 2008-101785 A | 5/2008 |
| JP | 2008-121900 A | 5/2008 |
| JP | 2008-138884 A | 6/2008 |
| JP | 2008-151345 A | 7/2008 |
| JP | 2008-215627 A | 9/2008 |
| JP | 2011-073528 A | 4/2011 |

* cited by examiner

ROTARY MACHINERY WITH A ONE-WAY CLUTCH INTEGRATED PULLEY

TECHNICAL FIELD

The present invention relates to rotary machinery with a one-way clutch integrated pulley that is used as an auxiliary machine, such as an alternator, for an automobile.

BACKGROUND ART

As disclosed in JP 2001-349413 (A) and JP 2003-232433 (A), one-way clutch integrated pulley devices have been conventionally used as pulley devices for driving auxiliary machines, such as an alternator, for an automobile.

Figure 8:
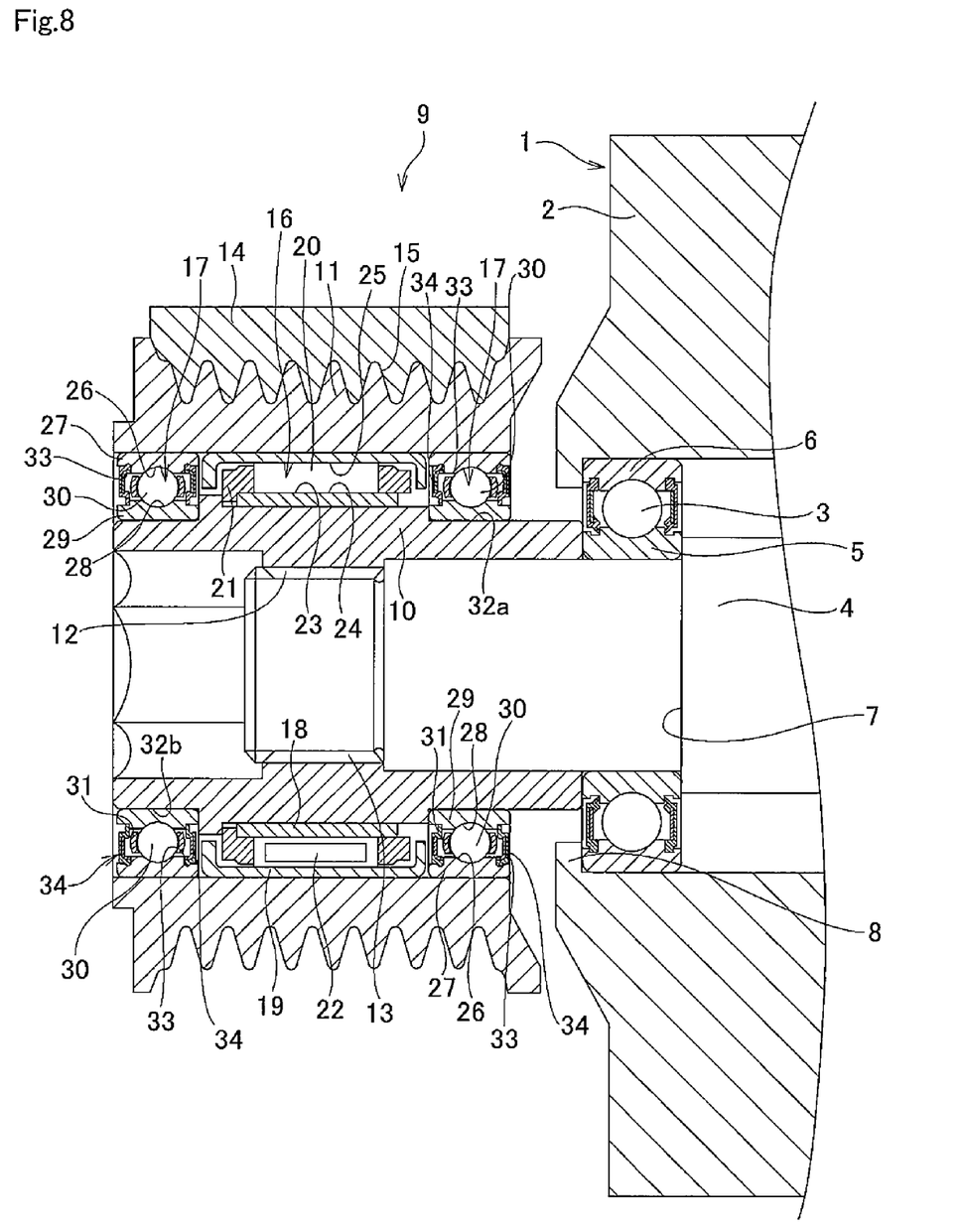
FIG. 8 is a cross-sectional view illustrating rotary machinery with a one-way clutch integrated pulley of an example of conventional construction.

FIG. 8 illustrates an example of conventional construction of rotary machinery with this kind of one-way clutch integrated pulley. A rotary machine 1 such as an alternator normally has a housing 2, and a rotating shaft 4 that is supported inside the housing 2 by way of a support bearing 3 so as to be able to rotate freely. An inner ring 5 of the support bearing 3 is fastened with an interference fit around the outside of the middle section in the axial direction of the rotating shaft 4 and an outer ring 6 of the support bearing 3 is fastened with an interference fit on the inside of the housing 2. In this state, in order to position the support bearing in the axial direction, one end surface (right end surface in FIG. 8) in the axial direction of the inner ring 5 comes in contact with a stepped section 7 that is provided around the middle section in the axial direction of the rotating shaft 4, and the other end surface (left end surface in FIG. 8) in the axial direction of the outer ring 6 comes in contact with an inward facing flange section 8 that is provided on the housing 2. In other words, the support bearing 3 is held from both sides in the axial direction by the stepped section 7 and an inward facing flange section 8. The tip end section (right end section in FIG. 8) of the rotating shaft 4 protrudes to the outside of the housing 2. For example, when the rotary machinery 1 is an alternator, the rotating shaft 4 corresponds to a rotating shaft of the alternator, and when the rotary machinery 1 is an auxiliary drive apparatus during an idling stop of the engine or an electric motor, the rotating shaft 4 corresponds to a crankshaft of the engine or a drive shaft of the electric motor.

A one-way clutch integrated pulley 9 has a sleeve 10 and pulley 11 that are arranged concentric with each other. The sleeve 10 is such that by screwing a female screw section 12 that is formed around the inner circumferential surface in the middle section in the axial direction onto a male screw section 13 that is formed around the outer circumferential surface on the tip end section of the rotating shaft 4, the sleeve 10 is supported by and fastened to the rotating shaft 4 so as to be able to rotate in synchronization with the rotating shaft 4. With this kind of sleeve 10, by one end surface (right end surface in FIG. 8) coming in contact with the other end surface (left end surface in FIG. 8) of the inner ring 5 of the support bearing 3, it is possible to position the rotating shaft 4 in the axial direction. Moreover, the pulley 11 is arranged around the sleeve 10, and is provided with belt grooves 15 for a belt (continuous belt) 14 that is placed around a drive pulley (not illustrated in the figure) and that is rotated and driven by the drive pulley.

Moreover, a one-way clutch 16 and a pair of support bearings 17 are provided between the outer circumferential surface of the sleeve 10 and the inner circumferential surface of the pulley 11. The one-way clutch 16 is such that torque is transmitted between the pulley 11 and the sleeve 10 only when there is a tendency for the pulley 11 to rotate in a specified direction relative to the sleeve 10. The one-way clutch 16 has a clutch inner ring 18, clutch outer ring 19, a plurality of rollers 20, a clutch cage 21 and the same number of springs 22 as rollers 20. The clutch inner ring 18 is fastened with an interference fit around the outer circumferential surface of the middle section in the axial direction of the sleeve 10, and by providing long concave sections 23 called ramp sections, which are long in the axial direction and that become deeper while going in a specified direction in the circumferential direction, at a plurality of evenly spaced locations in the circumferential direction around the outer circumferential surface thereof, the outer circumferential surface functions as a cam surface 24.

The plurality of rollers 20 and the clutch cage 21, which supports these rollers 20 so as to be able to roll and to displace a little in the circumferential direction, are provided between the cam surface 24 and a clutch outer-ring raceway 25, which is a cylindrical surface that is formed around the inner circumferential surface of the clutch outer ring 19. Springs 22 are provided between column sections, which are provided at a plurality of evenly space locations in the circumferential direction of the clutch cage 21, and the rollers 20, and these springs 22 elastically press the rollers 20 in a specified circumferential direction. Alternatively, it is possible to provide ramp sections at a plurality of location in the circumferential direction around the inner circumferential surface of the clutch outer ring, and for this inner circumferential surface to function as a cam surface, and for the outer circumferential surface of the clutch inner ring to be simply a cylindrical surface.

The outer diameter of the rollers 20 is less than the space between the outer circumferential surface of the clutch inner ring 18 and the inner circumferential surface of the clutch outer ring 19 in the portions where the concave sections 23 are formed, and is greater than the space between the outer circumferential surface of the clutch inner ring 18 and the inner circumferential surface of the clutch outer ring 19 in the portions separated in the circumferential direction from the concave sections 23. The rollers 20 are pressed by the springs 22 so as to bite like a stopper into the portions between the outer circumferential surface of the clutch inner ring 18 and the inner circumferential surface of the clutch outer ring 19 that are separated in the circumferential direction from the concave sections 23 where the spaces between these surfaces become narrow.

Moreover, the pair of support bearings 17 make relative rotation between the pulley 11 and sleeve 10 possible, while at the same time support radial loads that are applied to the pulley 11. In the example illustrated in the figure, a deep-groove ball bearing that in addition to being able to support radial loads that are applied to the pulley 11, is also able to support axial loads, is used as this kind of support bearing 17. In other words, the support bearing 17 comprises an outer ring 27 that has a deep-groove outer-ring raceway 26 around the inner circumferential surface thereof, an inner ring 29 that has a deep-groove inner-ring raceway 28 around the outer circumferential surface thereof, a plurality of balls 30 that are provided between the outer-ring raceway 26 and the inner-ring raceway 28 so as to be able to roll freely, and a cage 31 for supporting these balls 30. The outer rings 27 are fastened around the inside of both end sections in the axial direction of the pulley 11. Moreover, the inner rings 29 are fastened around the outside of small-diameter stepped sections 32a, 32b that are formed on both end sections in the axial direction of the sleeve 10. Opening sections on both end sections of the cylindrical space where the balls 30 are located are covered by seal rings 34, the outer circumferential edge sections thereof fitting in fitting grooves 33 that are formed around the inner circumferential surface of the outer ring 27. These seal rings 34, together with preventing grease that is filled inside the cylindrical space where the balls 30 are located from leaking out, prevent foreign matter such as dust from getting inside the space.

In this kind of one-way clutch integrated pulley 9, when the clutch outer ring 19 rotates with respect to the clutch inner ring 18 in the same direction that the springs 22 press the roller 20, the rollers 20 bite between the outer circumferential surface of the clutch inner ring 18 and the inner circumferential surface of the clutch outer ring 19, and a locked state occurs in which the clutch inner ring 18 and the clutch outer ring 19 rotate in synchronization. On the other hand, when the clutch outer ring 19 rotates with respect to the clutch inner ring 18 in the opposite direction that the springs 22 press the rollers 20, the rollers 20 are located in the portions where the concave sections 23 are formed, and roll in those portions, and an overrun state occurs in which torque is not transmitted between the clutch inner ring 18 and the clutch outer ring 19.

This kind of one-way clutch integrated pulley 9, when assembled with the rotating shaft 4 of rotary machinery 1 such as an engine or auxiliary machine, is housed inside the engine room of an automobile. The size and shape of this kind of engine room differ depending on the type of vehicle. In other words, the positional relationship between the installation location of the rotary machinery 1 such as an alternator, and the location in the axial direction of the belt 14 that is placed around the pulley 11 differs depending on the type of vehicle. Therefore, the location in the axial direction of the one-way clutch integrated pulley 9 with respect to the rotary machinery 1 must be changed for each type of vehicle. In the case of this construction, positioning the one-way clutch integrated pulley 9 in the axial direction with respect to the rotary machinery 1 is possible by bringing one end surface of the sleeve 10 in contact with the other end surface of the support bearing 3 that supports and fastens to the middle section in the axial direction of the rotating shaft 4. Therefore, in order to change the location in the axial direction of the one-way clutch integrated pulley 9 with respect to the rotary machinery 1 for each vehicle model, it is necessary to prepare a plurality of different types of sleeves 10 having different dimensions for the small-diameter stepped section 32 that is formed on the one end as a special part. This causes a problem in that the manufacturing cost of the rotary machinery with a one-way clutch integrated pulley increases.

RELATED LITERATURE

Patent Literature

[Patent Literature 1] JP 2001-349413 (A)
[Patent Literature 2] JP 2003-232433 (A)

SUMMARY OF THE INVENTION

Problem to be Solved by the Invention

In consideration of the problem described above, the object of the present invention is to reduce the manufacturing cost by providing rotary machinery with a one-way clutch integrated pulley that can be used in any type of vehicle even when the distance in the axial direction between the installation location of the rotary machinery and the drive belt that is placed around the pulley of the one-way clutch integrated pulley differs for each type of vehicle.

Means for Solving the Problems

The rotary machinery with one-way clutch integrated pulley of the present invention has a housing, a rotating shaft, a sleeve, a pulley, a one-way clutch, a pair of support bearings, and a spacer. The rotary machinery is composed of the housing and the rotating shaft. Moreover, the one-way clutch integrated pulley is composed of the sleeve, the pulley, the one-way clutch, and the pair of support bearings. For the spacer, construction can be employed in which the spacer is integrated with the one-way clutch integrated pulley.

A feature of the rotary machinery with a one-way clutch integrated pulley of the present invention is that instead of positioning the rotary machinery and the one-way clutch integrated pulley in the axial direction as was done conventionally by adjusting the length in the axial direction of the sleeve of the one-way clutch integrated pulley, a spacer is provided between the rotary machinery and the one-way clutch integrated pulley and held between these member, and positioning is performed by adjusting the length in the axial direction of that spacer. Preferably, the spacer is held between the one-way clutch integrated pulley and the rotary machinery without the end section on the rotary machinery side (one end side) of the sleeve protruding to one side from the one-way clutch integrated pulley. More preferably, the spacer is supported so as not to come apart in the axial direction from the one-way clutch integrated pulley.

In explaining the construction of the rotary machinery with a one-way clutch integrated pulley of the present invention in more detail, the housing houses an auxiliary machine such as engine or alternator of an automobile. The rotating shaft is supported inside the housing by way of a support bearing for the rotating shaft that is provided in the middle section in the axial direction thereof so as to be able to rotate freely, and rotates in connection with the movement of members provided in the housing.

On the other hand, the sleeve is fastened to a portion of the tip end section of the rotating shaft that protrudes outside the housing. The pulley is arranged so as to surround the sleeve and so as to be concentric with the sleeve. The one-way clutch is provided between the middle section in the axial direction of the outer circumferential surface of the sleeve and the middle section in the axial direction of the inner circumferential surface of the pulley, and allows torque to be transmitted between the pulley and the sleeve only when the pulley has a tendency to rotate in a specified direction relative to the sleeve. Furthermore, the pair of support bearings are provided on both sides of the one-way clutch, and between the outer circumferential surface of the sleeve and the inner circumferential surface of the pulley, and allow relative rotation of the pulley and the sleeve, while at the same time supports radial loads that are applied to the pulley.

The spacer is provided between the support bearing for the rotating shaft and the sleeve, and is for positioning the sleeve in the axial direction with respect to the rotating shaft.

Preferably, a small-diameter section is provided on the spacer such that small-diameter section is press fitted into the inner-diameters side of one end section of the sleeve.

Alternatively, it is possible to provide a small-diameter section on the spacer, with providing a protrusion formed on the outer circumferential surface of that small-diameter section, and provide a concave groove that fits with the protrusion around the entire circumference of the inner circumferential surface of one end of the sleeve.

Alternatively, it is possible to provide arm sections that extend in the axial direction at a plurality of locations in the circumferential direction of the spacer, with fitting tab sections that protrude outward in the radial direction on the tip end sections of the arm sections, and provide fitting grooves that fit with the fitting tab sections on the inner circumferential surface on one end section of the sleeve.

Alternatively, it is possible to provide arm sections that extend in the axial direction at a plurality of locations in the circumferential direction of the spacer, with protrusions that protrude outward in the radial direction on the tip end sections of the arm sections, and provide a groove section in the circumferential direction that fits with the sleeve on the inner circumferential surface of one end section of the sleeve, with groove sections in the axial direction that connect with the groove section in the circumferential direction formed on the inner circumferential surface of one end section of the sleeve in portions where the phase in the circumferential direction thereof matches that of the arm sections.

Effect of the Invention

With the present invention constructed as described above, it is possible to reduce the manufacturing cost of rotary machinery with a one-way clutch integrated pulley in which the location in the axial direction of the of the one-way clutch integrated pulley with respect to the rotary machinery changes. In other words, positioning of the sleeve in the axial direction with respect to the rotating shaft, and thus positioning of the one-way clutch integrated pulley with respect to the rotary machinery, is made possible by providing a spacer between a support bearing that is supported and fastened to the rotating shaft and the sleeve. Therefore, by selecting spacers having different thicknesses in the axial direction when the location in the axial direction of the one-way clutch integrated pulley with respect to the rotary machinery changes due to differences in types of vehicles, it is possible to adjust the location in the axial direction of the one-way clutch integrated pulley. As a result, it is not necessary to prepare a plurality of type of sleeves having different dimensions in the axial direction in order to change the location in the axial direction of the one-way clutch integrated pulley with respect to the rotary machinery, and thus it is possible to reduce the manufacturing cost of the rotary machinery with a one-way clutch integrated pulley.

Moreover, in a preferable form of the present invention, it is possible to prevent the spacer from coming apart from the one-way clutch integrated pulley before the one-way clutch integrated pulley is assembled with the rotary machinery. As a result, it is possible to simplify the assembly and transport of rotary machinery with a one-way clutch integrated pulley, and to further reduce the manufacturing cost.

MODES FOR CARRYING OUT THE INVENTION

First Example

Figure 1:
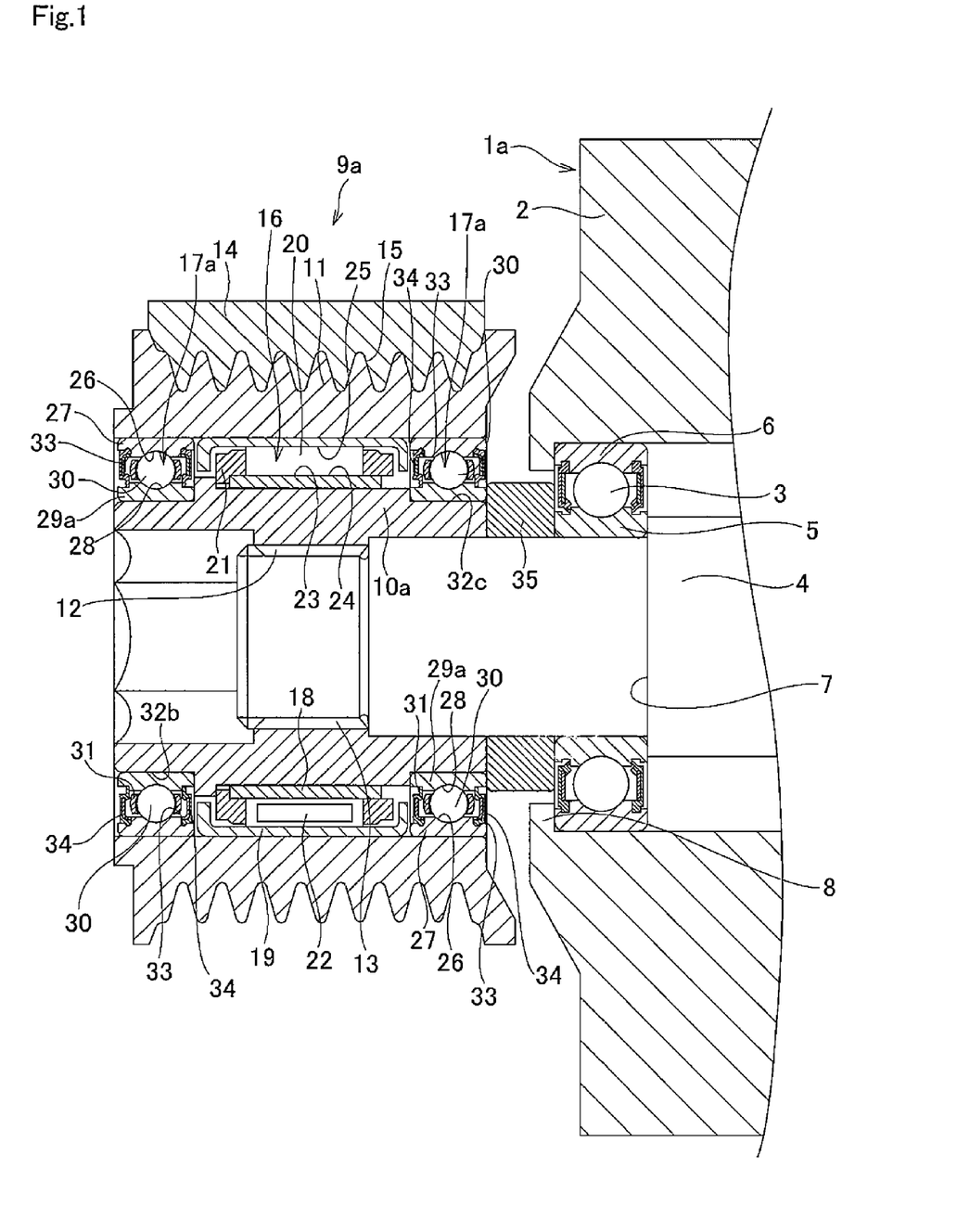
FIG. 1 is a cross-sectional view illustrating rotary machinery with a one-way clutch integrated pulley of a first example of an embodiment of the present invention.

FIG. 1 illustrates a first example of an embodiment of the present invention. A feature of the present invention, including this example, is in the construction for reducing the manufacturing cost of rotary machinery with a one-way clutch integrated pulley in which the location in the axial direction of the one-way clutch integrated pulley $9a$ with respect to the rotary machinery $1a$ differs. The other construction and functions are the same as conventionally known rotary machinery with a one-way clutch integrated pulley, which includes the construction illustrated in FIG. 8.

The rotary machinery with one-way clutch integrated pulley of this example comprise a rotary machinery $1a$, a one-way clutch integrated pulley $9a$, and a spacer 35. The one-way clutch integrated pulley $9a$ is constructed by combining a sleeve $10a$ and a pulley 11 by way of a one-way clutch 16 and a pair of support bearings $17a$. In the example in the figure, deep-groove ball bearings are used as the support bearings $17a$. However, the support bearings $17a$ are not limited to being ball bearings, and it is also possible to use various kinds of bearings, such as roller bearings, that are capable of supporting radial loads. It is also not necessary for the pair of support bearings $17a$ to be the same kind of bearing, and it is possible for one of the support bearings $17a$ to be a ball bearing, and the other a roller bearing, and it is also possible for the outer diameters or inner diameters of the bearings to be different from each other.

In the case of this example, of the small-diameter sections $32c$, $32b$ that are formed on both end sections in the axial direction of the sleeve $10a$, the dimension in the axial direction of the small-diameter section $32c$ on one end side (right side in FIG. 1) is nearly equal to the dimension in the axial direction of the inner ring $29a$ of the support bearing $17a$ on one end side of the pair of support bearings $17a$. In other words, with the inner ring $29a$ of the support bearing $17a$ on one end side fastened around the outside of the small-diameter section $32c$ on one end side, the location in the axial direction of the one end surface of the inner ring $29a$ coincides with that of the one end surface of the sleeve $10a$, and the inner ring $29a$ does not protrude to the one end side of the sleeve $10a$. A circular ring shaped spacer 35 is held between the one end surface of the sleeve $10a$ and the other end surface of the inner ring 5 of the support bearing 3 for the rotating shaft 4 that is fastened around the outside of the middle section in the axial direction of the rotating shaft 4. This kind of spacer 35 is made using synthetic resin, a light alloy such as an aluminum alloy, or a ferrous alloy such as carbon steel. The dimension in the axial direction of the spacer 35 is appropriately set according to the positional relationship between the rotary machinery 1 and the one-way clutch integrated pulley $9a$ that is set for each type of vehicle.

In the case of this example, it is possible to reduce the manufacturing cost of the rotary machinery with one-way clutch integrated pulley in which the location in the axial direction of the one-way clutch integrated pulley 9a with respect to the rotary machinery 1 differs. In other words, in the case of the conventional construction illustrated in FIG. 8, in order to adjust the location in the axial direction of the one-way clutch integrated pulley 9 with respect to the rotary machinery 1, it is necessary to use different one-way clutch integrated pulleys in which the dimension in the axial direction of one end section (right end section in FIG. 8) of the sleeve 10 differs, and so it is necessary to prepare a plurality of rotary machinery with one-way clutch integrated pulley. However, in the case of this example, adjustment of the location in the axial direction of the one-way clutch integrated pulley 9a with respect to the rotary machinery 1a can be performed by using a spacer 35 having an appropriate thickness. Therefore, regardless of the difference in the type of vehicle, only one kind of one-way clutch integrated pulley needs to be prepared, so it is possible to reduce the manufacturing cost thereof. With this kind of spacer 35 it is possible to prepare different kinds of spacers having appropriate thicknesses for each type of vehicle, or it is also possible to use a plurality of thin spacers together so that thickness becomes a specified thickness.

In the case of this example, the outer diameter of the spacer 35 is sufficiently larger than the outer diameter of the sleeve 10 of the conventional construction illustrated in FIG. 8, so penetration of foreign matter such as dust or muddy water into the inside of the support bearing 3 by way of the gap between the outer circumferential surface of the spacer 35 and the inner circumferential surface of the inward facing flange section 8 is suppressed. By making the outer diameter of the spacer 35 even larger, it is possible to create labyrinth clearances by causing the outer circumferential surface of the spacer 35 to closely face the inner circumferential surface of the inward facing flange section 8 around the entire circumference, and causing the side surface on the other end side of the spacer 35 to closely face the one end surface in the axial direction of the seal ring 34 of the support bearing 17a on the one end side around the entire circumference. As a result, it is possible to effectively prevent foreign matter such as dust and muddy water from penetrating into both the support bearing 17a on the one end side, and the support bearing 3. Rotary machinery with a one-way clutch integrated pulley having this kind of construction is also within the scope and range of the present invention.

Second Example

Figure 2:
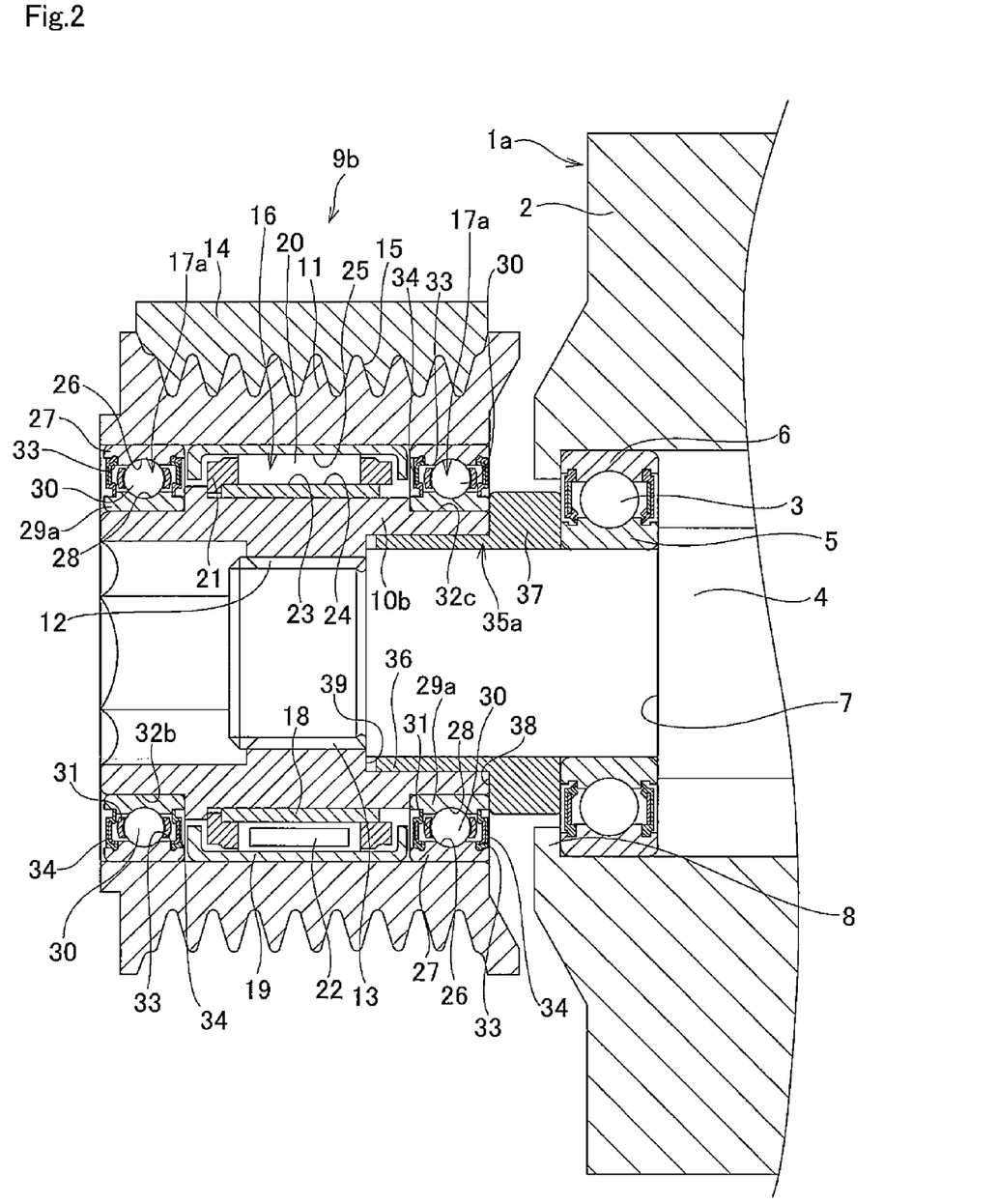
FIG. 2 is a cross-sectional view illustrating rotary machinery with a one-way clutch integrated pulley of a second example of an embodiment of the present invention.

FIG. 2 illustrates a second example of an embodiment of the present invention. In this example, the spacer 35a has a stepped cylindrical shape in which a small-diameter section 36 and held section 37 are connected by a stepped section 38. The outer diameter of the small-diameter section is a little larger than the inner diameter of one end section (right end section in FIG. 2) of the sleeve 10b. Therefore, by press fitting the small-diameter section 36 of the spacer 35a into the one end section of the sleeve 10b, it is possible to prevent the spacer 35a from coming off from the one-way clutch integrated pulley 9b in the state before the one-way clutch integrated pulley 9b is assembled with the rotating shaft 4 of the rotary machinery 1a. With this kind of construction, the one-way clutch integrated pulley 9b with the spacer 35a assembled is handled as a unit, so it is possible to simplify transport and assembly of the one-way clutch integrated pulley 9b.

In this example, positioning of the spacer 35a in the axial direction with respect to the one-way clutch integrated pulley 9b is possible by the one end surface of the sleeve 10b coming in contact with the stepped section 38 of the spacer 35a. Therefore, the dimension in the axial direction of the small-diameter section 36 is regulated so that the tip end surface (left end surface in FIG. 2) of the small-diameter section 36 does not come in contact with the inner-diameter side stepped section 39 of the sleeve 10b when the small-diameter section 36 is press fitted into the one end section of the sleeve 10b and one end surface (right end surface in FIG. 2) of the sleeve 10b comes in contact with the stepped section 38 of the spacer 35a.

In this example, it is possible to prepare a plurality of types of spacers 35a, the held section 37 or the small-diameter section 36 thereof having different dimensions in the axial direction, and to select a spacer 35a having suitable dimensions for each type of vehicle, and assemble that spacer 35a in the one-way clutch integrated pulley 9b beforehand. In doing so, during assembly it is possible to easily adjust the location in the axial direction of the one-way clutch integrated pulley 9b with respect to the rotary machinery 1a. However, it is also possible to assemble the spacer 35a, the held section 37 thereof having a specified dimension in the axial direction, in the one-way clutch integrated pulley 9b in advance, and then during assembly, adjust the location in the axial direction of the one-way clutch integrated pulley 9b by combining the spacer 35a with a cylindrical spacer 35 such as that described in the first example of an embodiment. The other construction and functions are the same as that in the first example of an embodiment.

Third Example

Figure 3:
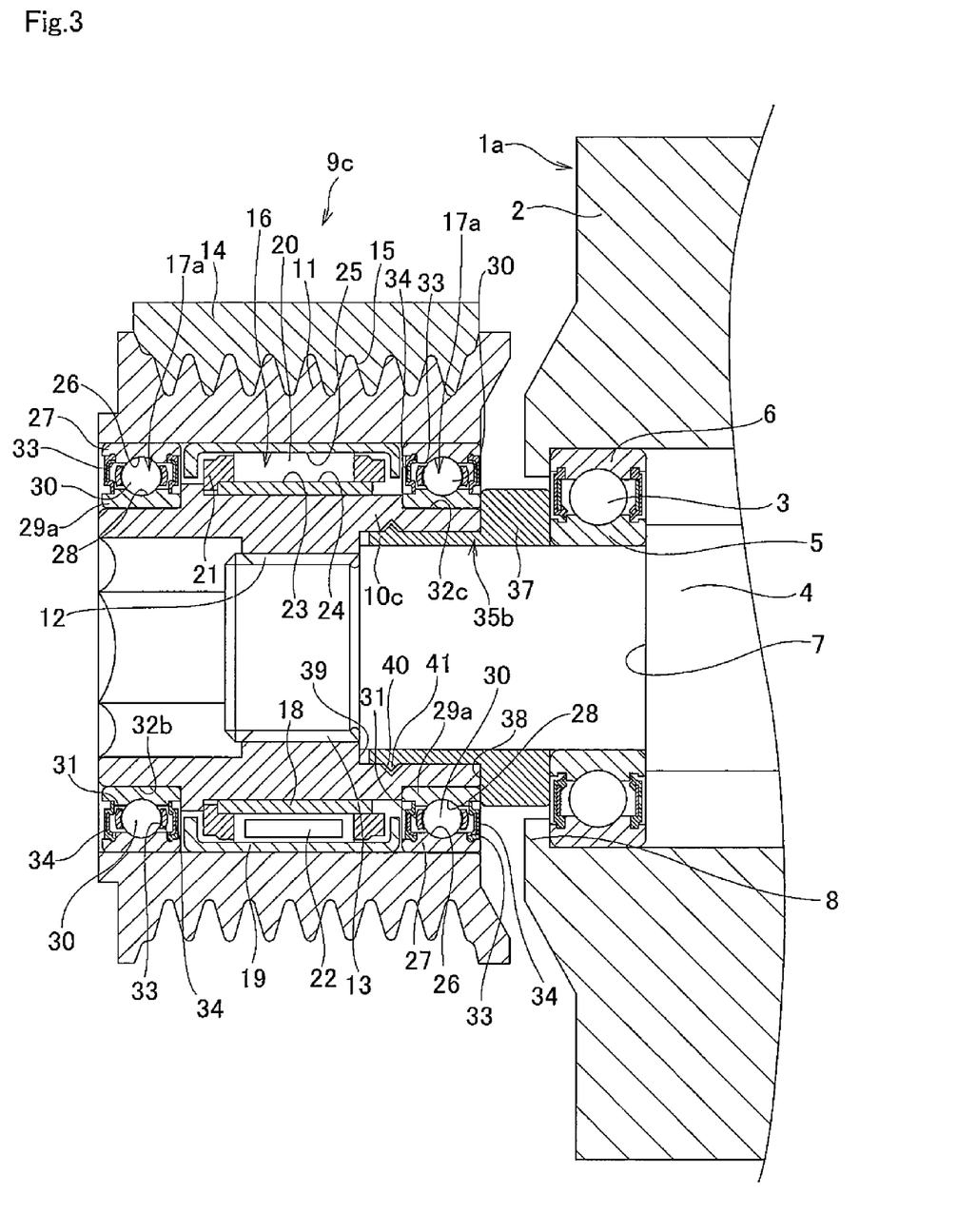
FIG. 3 is a cross-sectional view illustrating rotary machinery with a one-way clutch integrated pulley of a third example of an embodiment of the present invention.

FIG. 3 illustrates a third example of an embodiment of the present invention. In this example, a concave groove 40 is formed around the entire circumference of the inner circumferential surface of one end section of the sleeve 10c, and a protrusion 41 is formed around the entire circumference of the outer circumferential surface of the small-diameter section 36a of the spacer 35b. Preferably, the concave groove 40 is formed in the thick portion of the inner circumferential surface of the sleeve 10c that is separated from the portion where the small-diameter section 32c is formed around the outer circumferential surface. Moreover, it is possible to form the concave groove 40 and protrusion 41 intermittently in the circumferential direction at locations that are aligned with each other in the circumferential direction. In the construction of this example, the small-diameter section 36a is formed so that the outer diameter of the small-diameter section 36a is a little less than the inner diameter of the one end section of the sleeve 10c, and the outer diameter of the protrusion 41 is larger than the inner diameter of the one end section of the sleeve 10c, and a little less than the inner diameter of the concave groove 40. Moreover, the location in the axial direction of the concave groove 40 and protrusion 41 is set so that the concave groove 40 and protrusion 41 fit together when the small-diameter section 36a is inserted into the inner-diameter side of the one end section of the sleeve 10c, and the stepped section 38 is in contact with the one end surface of the sleeve 10c.

In this example, the small-diameter section 36a is loosely inserted into the inner-diameter side of the one end section of the sleeve 10c while the protrusion 41 elastically deforms, and by the concave groove 40 and protrusion 41 fitting together, the spacer 35b is prevented from coming apart from the one-way clutch integrated pulley 9c before the one-way clutch integrated pulley 9c is assembled with the rotary machinery 1a. As long as it is possible to prevent the spacer 35b from coming apart from the one-way clutch integrated pulley 9c before the one-way clutch integrated pulley 9c is assembled with the rotary machinery 1a, the spacer 35b does not need to be tightly fastened to the one-way clutch integrated pulley 9b. After assembled with the rotary machinery 1a, the inner circumferential surface of the spacer 35b is pressed to the outer-diameter side by the outer circumferential surface of the rotating shaft 4, and the small-diameter section 36a of the spacer 35b becomes tightly fastened between the outer circumferential surface of the rotating shaft 4 and the inner circumferential surface of the one end section of the sleeve 10c. In this example, the small-diameter section 36a of the spacer 35b does not need to be press fitted into the one end section of the sleeve 10c, so the work of assembling the spacer 35b with the sleeve 10c can be simplified. The other construction and functions are the same as in the second example of an embodiment. It is also possible to additionally provide the fitting construction of the concave section 40 and protrusion 41 to the construction of the second example of an embodiment.

Fourth Example

Figure 4:
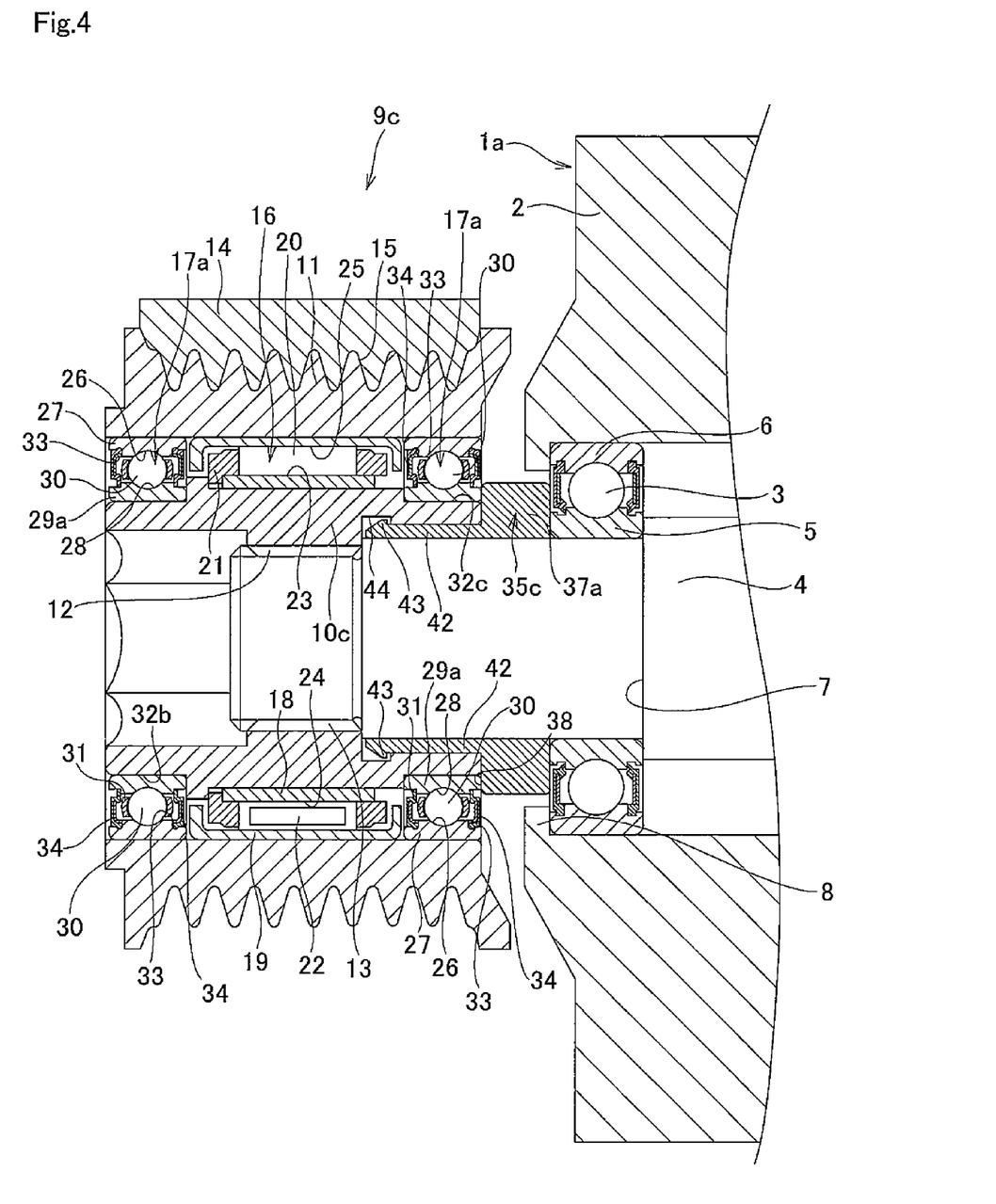
FIG. 4 is a cross-sectional view illustrating rotary machinery with a one-way clutch integrated pulley of a fourth example of an embodiment of the present invention.
Figure 5:
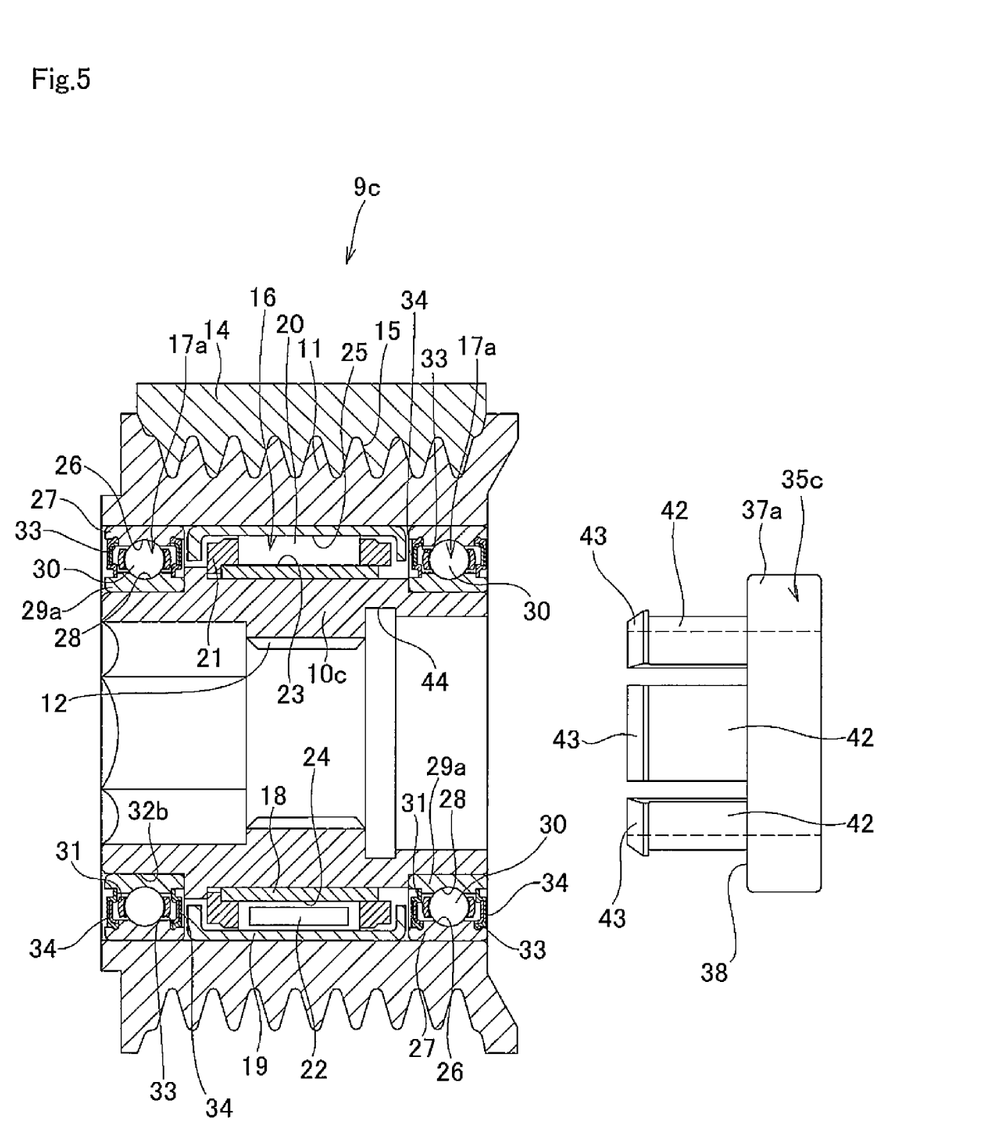
FIG. 5 is a cross-sectional view illustrating a one-way clutch integrated pulley removed from the machinery of the fourth example of an embodiment of the present invention in the state before assembling a spacer thereinto.

FIG. 4 and FIG. 5 illustrate a fourth example of an embodiment of the present invention. In this example, arm sections 42 that extend in the axial direction are provided at a plurality of locations in the circumferential direction of the held sections 37a of the spacer 35c, and fitting tab sections 43 are provided on the tip end sections of the arm sections 42. The arm sections 42 of the spacer 35c are formed such that the outer diameter of the arm sections 42 is a little less than the inner diameter of the one end section of the sleeve 10d, and so as to have a specified width in the circumferential direction and a specified thickness. The specified dimensions of the arm sections 42 are appropriately set within a range so as not to plastically deform when arm sections 42 are elastically deformed. Moreover, a fitting groove 44 that fits with the fitting tab sections 43 is formed around the entire circumference on the inner circumferential surface of the sleeve 10d. In this example, the fitting tab sections 43 are formed so that the outer diameter of the fitting tab sections 43 is greater than the inner diameter of the one end section of the sleeve 10d, and is a little less than the inner diameter of the concave groove 40. Furthermore, in order to simplify assembly, the dimension in the axial direction of the fitting groove 44 is greater than the dimension in the axial direction of the fitting tab sections 43, and when the one-way clutch integrated pulley 9c and spacer 35c are assembled with the rotary machinery 1a, there is a gap between both sides in the axial direction of the fitting tab sections 43 and the side surface in the axial direction of the fitting groove 44.

When assembling the spacer 35c with the sleeve 10d, the arm sections 42 are inserted in the one end section of the sleeve 10d while elastically deforming the arm sections 42 inward in the radial direction. When the fitting tab sections 43 fit in the fitting groove 44, the arm sections 42 are elastically restored outward in the radial direction. As a result, the fitting tab sections 43 fit with the fitting groove 44. The cross-sectional shape of the fitting tab sections 43 is not limited to a triangular shape as illustrated in FIG. 4, and can also be a trapezoidal or rectangular shape. The other construction and functions are the same as in the third example of an embodiment.

Fifth Example

Figure 6:
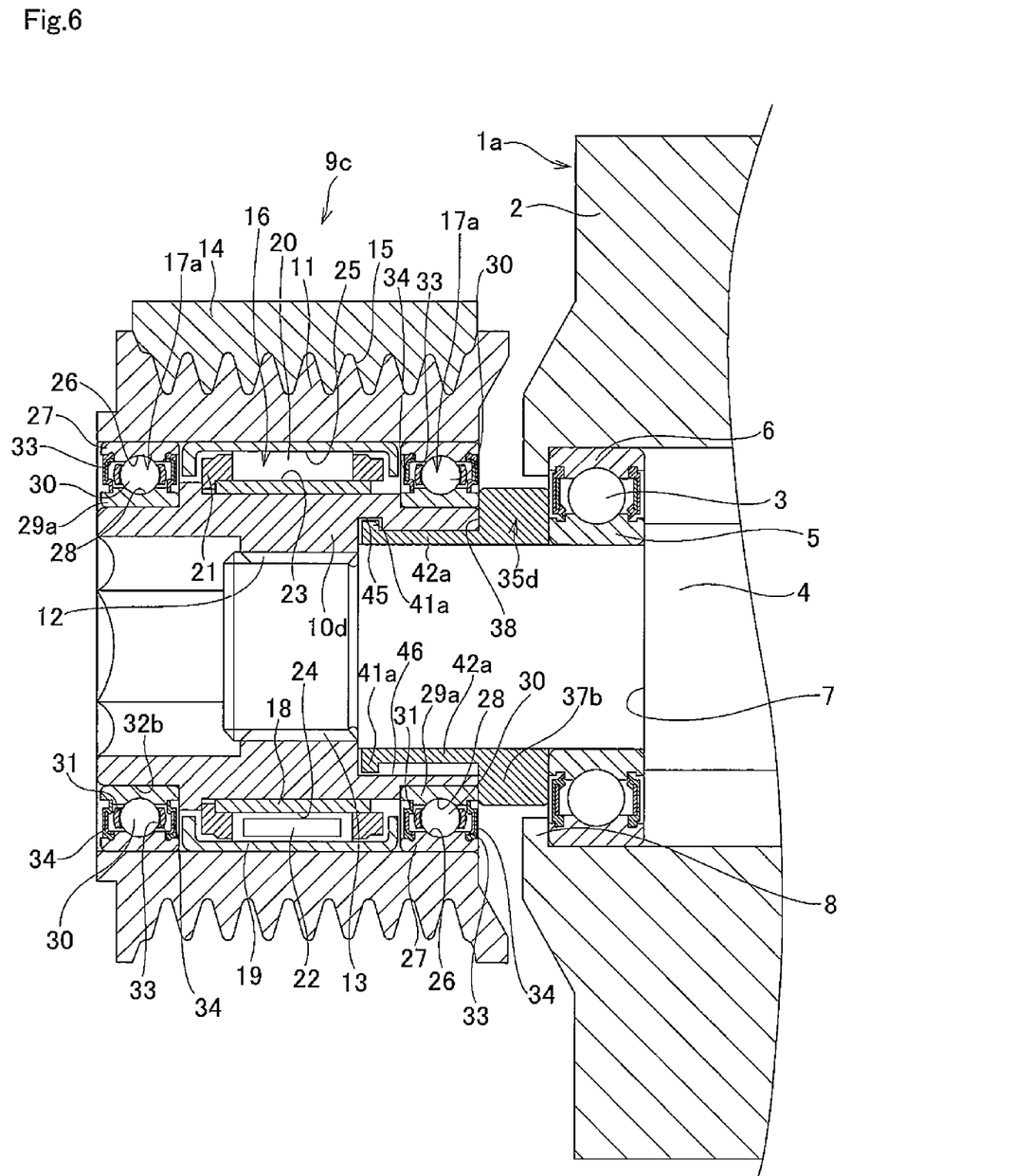
FIG. 6 is a cross-sectional view illustrating rotary machinery with a one-way clutch integrated pulley of a fifth example of an embodiment of the present invention.
Figure 7:
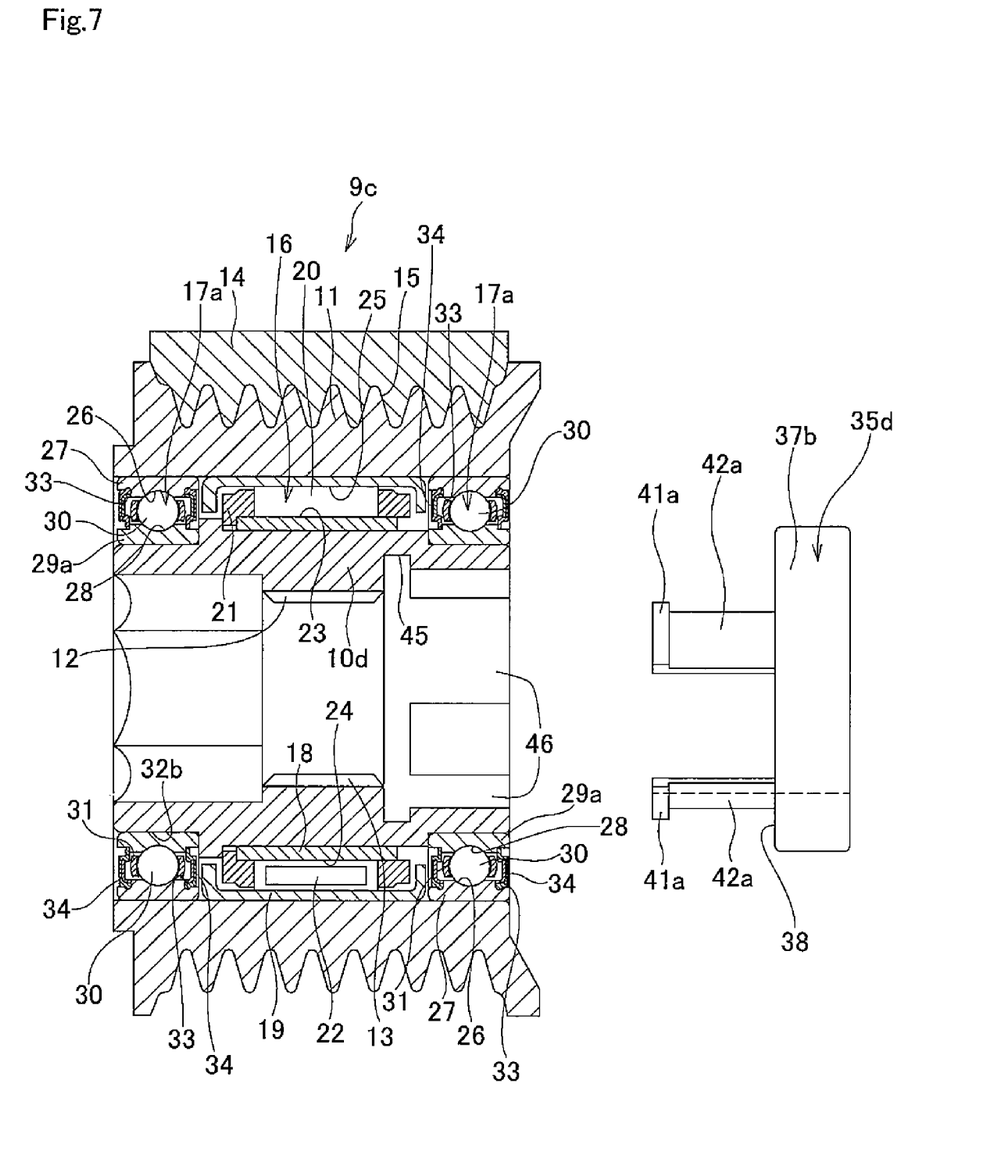
FIG. 7 is a cross-sectional view illustrating the state before assembling a spacer when the one-way clutch integrated pulley is removed from the machinery of the fifth example of an embodiment of the present invention.

FIG. 6 and FIG. 7 illustrate a fifth example of an embodiment of the present invention. In this example, arm sections 42a that extend in the axial direction are provided at a plurality of locations in the circumferential direction of the held section 37b of the spacer 35d, and protrusions 41a that protrude outward in the radial direction are provided on the tip end sections of the arm sections 42a. Together with providing a concave groove 45 in the circumferential direction around the entire circumference of the sleeve 10e, concave grooves 46 in the axial direction that extend from a plurality of locations in the circumferential direction of the inside surface of one end side of the concave section 45 in the circumferential direction to the opening on the one end section of the sleeve 10e are provided. The outer diameter of these concave grooves 45 in the axial direction is greater than the outer diameter of the protrusions 41a, and less than the outer diameter of the held sections 37b. Therefore, when assembling the spacer 35d with the sleeve 10e, the arm sections 42a are inserted into the inner-diameter side of the sleeve 10e with the phase of the arm sections 42a aligned with the phase of the concave grooves 46 in the axial direction. With the protrusions aligned with the concave groove 45 in the circumferential direction, the spacer is rotated a specified angle. As a result, the one end surface of the protrusions 41a fit with the inside surface on the one end side of the concave groove 45 in the circumferential direction, and prevents the spacer 35d from coming apart from the one-way clutch integrated pulley 9c. The shape of the protrusions 41a when seen in the circumferential direction is not limited to a rectangular shape as illustrated in FIG. 6 and FIG. 7, but can also be a trapezoidal or triangular shape.

Moreover, it is also possible to arrange the arm sections of the spacer and the concave grooves in the axial direction on the inner circumferential surface of the sleeve such that the phase in the circumferential direction is not uniform, or it is also possible to make the widths in the circumferential direction different from each other. In doing so, it is possible to make it even more difficult for the spacer to come apart from the one-way clutch integrated pulley even when the spacer is rotated during transport. In this example as well, it is enough that the spacer 35d be prevented from coming apart from the one-way clutch integrated pulley 9d before the one-way integrated pulley 9d is assembled with the rotary machinery 1a, so there are gaps in the axial direction and circumferential direction between the protrusions 41a and the concave groove 45 in the circumferential direction. In doing so, it is possible to simplify assembly of the spacer 35d in the one-way clutch integrated pulley 9d. The other construction and functions are the same as in the fourth example of an embodiment.

EXPLANATION OF REFERENCE NUMBERS 1, 1a Rotary machinery
2 Housing
3 Support bearing (for Rotating shaft)
4 Rotating shaft
5 Inner ring
6 Outer ring
7 Stepped section
8 Inward facing flange section
9, 9a to 9c One-way clutch integrated pulley
10, 10a to 10e Sleeve
11 Pulley
12 Female screw section
13 Male screw section
14 Belt
15 Belt groove
16 One-way clutch
17, 17a Support bearing 18 Clutch inner ring
19 Clutch outer ring
20 Roller
21 Clutch cage
22 Spring
23 Concave section
24 Cam surface
25 Clutch outer-ring raceway
26 Outer-ring raceway
26 Outer ring
28 Inner-ring raceway
29, 29a Inner ring
30 Ball
31 Cage
32a to 32c Small-diameter section
33 Fitting groove
34 Seal ring
35, 35a to 35d Spacer
36, 36a Small-diameter section
37, 37a, 37b Held section
38 Stepped section
39 Inner-diameter side stepped section
40 Concave groove
41, 41a Protrusion
42, 42a Arm section
43 Fitting tab section
44 Fitting groove
45 Concave groove in the circumferential direction
46 Concave groove in the axial direction

What is claimed is:

1. Rotary machinery with a one-way clutch integrated pulley, comprising:
a housing;
a rotating shaft that is supported inside the housing by way of a support bearing so as to be able to rotate freely;
a sleeve that is fastened to a portion of an end section of the rotating shaft that protrudes outside the housing;
a pulley that is arranged so as to surround the sleeve and so as to be concentric with the sleeve;
a one-way clutch that is provided between the outer circumferential surface of the sleeve and the inner circumferential surface of the pulley, and that allows torque to be transmitted between the pulley and the sleeve only when the pulley has a tendency to rotate in a specified direction relative to the sleeve;
a pair of support bearings that are provided on both sides of the one-way clutch, and between the outer circumferential surface of the sleeve and the inner circumferential surface of the pulley, and that allow relative rotation of the pulley and the sleeve, while at the same time supports radial loads that are applied to the pulley; and
a spacer that is provided between the support bearing for the rotating shaft and the sleeve, and that is for positioning the sleeve in the axial direction with respect to the rotating shaft,
wherein a small-diameter section is provided on the spacer, and that small-diameter section is press fitted into the inner-diameter side of one end section of the sleeve.

2. The rotary machinery with a one-way clutch integrated pulley according to claim 1, wherein an end surface on the housing side of the sleeve does not protrude in the axial direction from an end surface on the housing side of one of the pair of support bearings.

\* \* \* \* \*